US012672163B2

(12) United States Patent
Tsai et al.

(10) Patent No.: US 12,672,163 B2
(45) Date of Patent: Jun. 30, 2026

(54) METHOD OF LOGICAL CHANNEL PRIORITIZATION AND DEVICE THEREOF

(71) Applicant: Industrial Technology Research Institute, Hsinchu (TW)

(72) Inventors: Tzu-Jane Tsai, Hsinchu County (TW); Chun-Yuan Chiu, Pingtung County (TW)

(73) Assignee: Industrial Technology Research Institute, Hsinchu (TW)

( * ) Notice: Subject to any disclaimer, the term of this patent is extended or adjusted under 35 U.S.C. 154(b) by 293 days.

(21) Appl. No.: 18/490,734

(22) Filed: Oct. 19, 2023

(65) Prior Publication Data

US 2024/0155664 A1 May 9, 2024

Related U.S. Application Data

(60) Provisional application No. 63/422,010, filed on Nov. 3, 2022.

(51) Int. Cl.
H04W 72/56 (2023.01)
H04W 28/02 (2009.01)
(Continued)

(52) U.S. Cl.
CPC ....... H04W 72/56 (2023.01); H04W 28/0278 (2013.01); H04W 72/1268 (2013.01); H04W 72/512 (2023.01)

(58) Field of Classification Search
CPC ............. H04W 72/56; H04W 72/1268; H04W 28/0278; H04W 72/512
See application file for complete search history.

(56) References Cited

U.S. PATENT DOCUMENTS 11,363,612 B2    6/2022   et al.
11,582,719 B2    2/2023   Lin
(Continued)

FOREIGN PATENT DOCUMENTS

CN        111294165        6/2020
TW        I692989          5/2020

OTHER PUBLICATIONS

3GPP, "3rd Generation Partnership Project; Technical Specification Group Radio Access Network; NR; Study on XR (Extended Reality) Evaluations for NR (Release 17)", 3GPP TR 38.838 V17.0.0, Dec. 2021, pp. 1-272.
(Continued)

*Primary Examiner* — Ajay Cattungal
(74) *Attorney, Agent, or Firm* — JCIPRNET

(57) ABSTRACT

A method of logical channel prioritization and a device thereof are provided. The method includes: obtaining a radio resource control configuration message from a base station, wherein the radio resource control configuration message includes a plurality of logical channels with priority values respectively; sending a buffer status report (BSR) associated to data buffered in logical channels to be uploaded to the base station; obtaining an uplink grant information from the base station; scheduling and allocating resources for the uplink grant information to data buffered in logical channels to be uploaded based on the priority of logical channels or based on at least one parameter, to make a medium access control (MAC) PDU, wherein the data buffered in logical channels to be uploaded are divided into a plurality of protocol data unit (PDU) sets, the at least one parameter are set in each of the PDU sets or in the logical channels to indicate transmission priorities among the PDU sets respectively; and uploading the MAC PDU to the base station.

18 Claims, 12 Drawing Sheets

(51) Int. Cl.
    *H04W 72/1268*     (2023.01)
    *H04W 72/512*     (2023.01)

(56)           References Cited

U.S. PATENT DOCUMENTS

| | | | | |
|---|---|---|---|---|
| 2017/0311317 A1* | 10/2017 | Dinan | .................... | H04W 72/23 |
| 2018/0324641 A1 | 11/2018 | Tsai et al. | | |
| 2018/0332585 A1* | 11/2018 | Faurie | ..................... | H04W 4/70 |
| 2019/0356450 A1* | 11/2019 | He | ......................... | H04W 72/20 |
| 2020/0275474 A1* | 8/2020 | Chen | ..................... | H04L 1/1607 |
| 2020/0314960 A1* | 10/2020 | Basu Mallick | ... | H04W 28/0268 |
| 2021/0127385 A1* | 4/2021 | Kung | ..................... | H04L 5/0007 |
| 2021/0144580 A1 | 5/2021 | Alfarhan et al. | | |
| 2021/0235464 A1 | 7/2021 | Loehr et al. | | |
| 2021/0307027 A1* | 9/2021 | Kung | ................ | H04W 72/1268 |
| 2021/0337423 A1* | 10/2021 | Ali | ......................... | H04W 76/14 |
| 2022/0052820 A1* | 2/2022 | Ling | ......................... | H04L 1/18 |
| 2022/0078670 A1* | 3/2022 | Kung | ................ | H04W 28/0278 |

OTHER PUBLICATIONS

3GPP, "3rd Generation Partnership Project; Technical Specification Group Radio Access Network; NR; Study on XR enhancements for NR (Release 18)", 3GPP TR 38.835 V1.0.0, Dec. 2022, pp. 1-121.

Nokia, "Revised SID : Study on XR Enhancements for NR", 3GPP TSG RAN Meeting #95e RP-220285, Mar. 17-23, 2022, pp. 1-5.

3GPP, "3rd Generation Partnership Project; Technical Specification Group Radio Access Network; NR; Medium Access Control (MAC) protocol specification (Release 17)", 3GPP TS 38.321 V17.3.0, Dec. 2022, pp. 1-251.

Qualcomm Incorporated, "Discussion on PDU prioritization", 3GPP TSG-RAN WG2 Meeting #120 R2-2211178, Nov. 14~18, 2022, pp. 1-3.

Apple, "Enhancements for Traffic Prioritization in XR", 3GPP TSG-RAN WG2 Meeting #120 R2-2211719, Nov. 14~18, 2022, pp. 1-7.

Fredrik Alriksson et al., "XR and 5G:Extended reality at scale with time-critical communication", Ericsson Technology Review, Aug. 24, 2021, pp. 1-14.

"Office Action of Taiwan Counterpart Application", issued on Jun. 24, 2024, p. 1-p. 29.

Vivo, "Discussion on XR-awareness", 3GPP TSG-RAN WG2 Meeting #119-e, R2-2207756, Aug. 17-26, 2022, pp. 1-12.

"3rd Generation Partnership Project; Technical Specification Group Radio Access Network; NR; Medium Access Control (MAC) protocol specification (Release 17)", 3GPP TS 38.321, Oct. 1, 2022, pp. 1-246, V17.20.

III, "Discussion on Feedback enhancements for XR-specific capacity improvements", 3GPP TSG-RAN WG2 Meeting #119bis electronic, R2-2210621, Oct. 10-19, 2022, pp. 1-2.

CATT, "LCP restriction enhancement for reliability", 3GPP TSG-RAN WG2 Meeting #107bis, R2-1912217, Oct. 14-18, 2019, pp. 1-2.

Vivo, "Reliability-based LCP Restriction Enhancement for DG", 3GPP TSG-RAN WG2#107bis, R2-1912319, Oct. 14-18, 2019, pp. 1-3.

Google Inc., "Discussion on PDU prioritization", 3GPP TSG-RAN WG2 Meeting #119bis-e, R2-2210361, Oct. 10-19, 2022, pp. 1-3.

"Search Report of Europe Counterpart Application", issued on Mar. 18, 2024, p. 1-p. 15.

\* cited by examiner

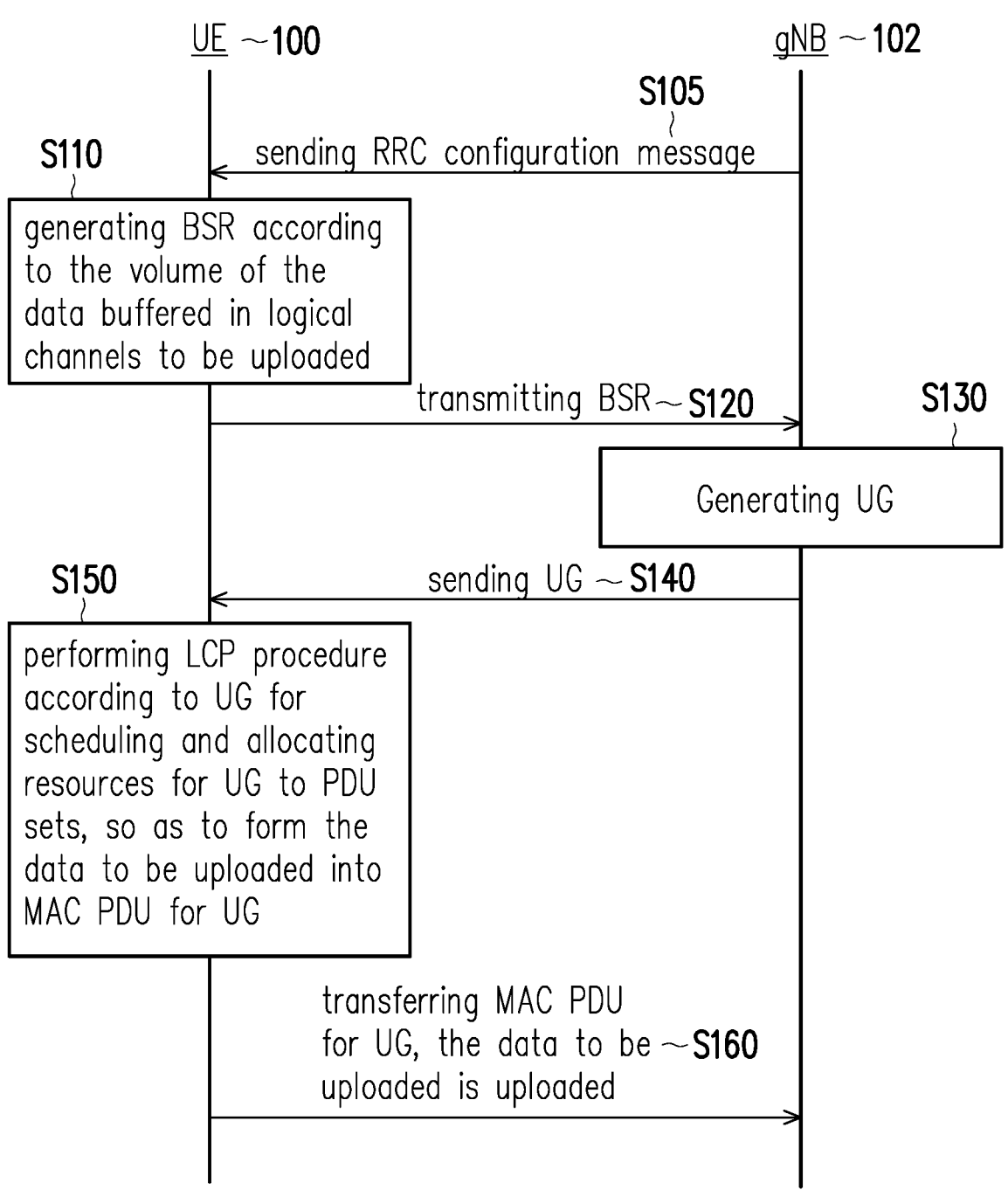

UE ~100                                    gNB ~102

S105

S110          sending RRC configuration message generating BSR according
to the volume of the
data buffered in logical
channels to be uploaded transmitting BSR~ S120          S130

Generating UG

S150          sending UG ~ S140 performing LCP procedure
according to UG for
scheduling and allocating
resources for UG to PDU
sets, so as to form the
data to be uploaded into
MAC PDU for UG transferring MAC PDU
for UG, the data to be ~S160
uploaded is uploaded

FIG. 1

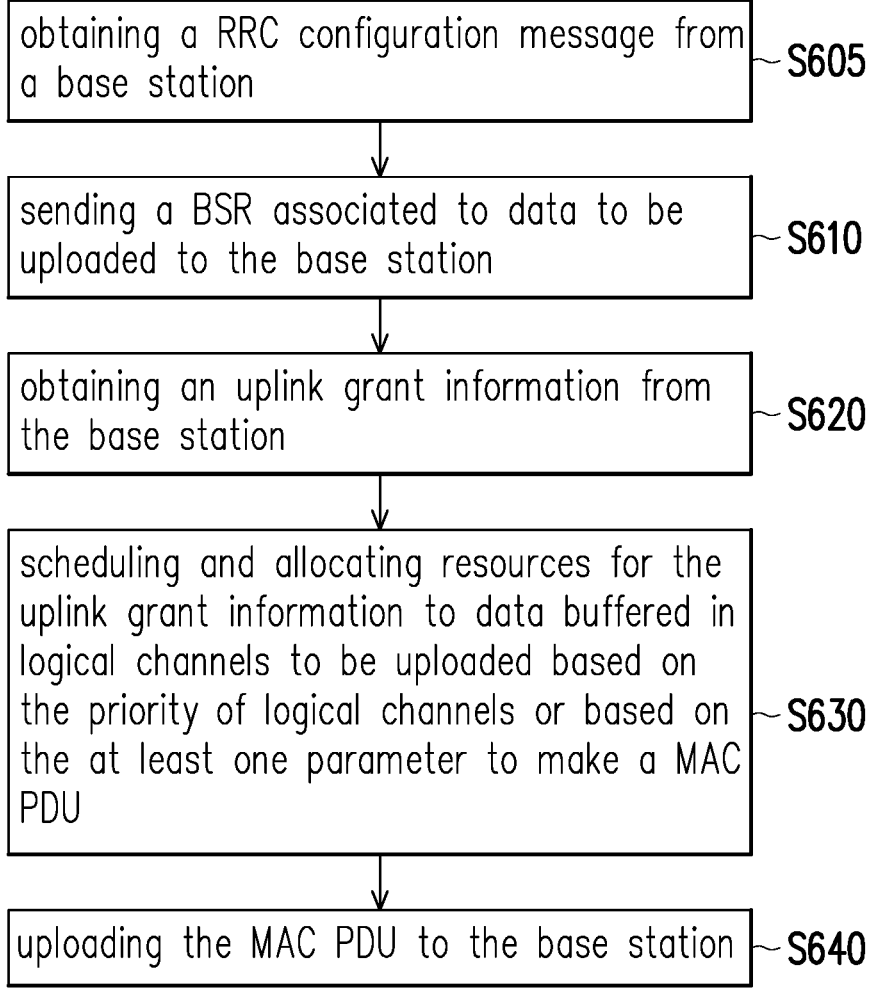

obtaining a RRC configuration message from a base station ~S605 sending a BSR associated to data to be uploaded to the base station ~S610 obtaining an uplink grant information from the base station ~S620 scheduling and allocating resources for the uplink grant information to data buffered in logical channels to be uploaded based on the priority of logical channels or based on the at least one parameter to make a MAC PDU ~S630 uploading the MAC PDU to the base station ~S640

FIG. 6

Scheduling Order :

[A=80] SDU 1-2 -> SDU 2-1  -> SDU 1-1 -> SDU 1-3 -> SDU 2-2 -> SDU 3-1;

[A=20] SDU 1-1 -> SDU 2-1  -> SDU 1-2 -> SDU 1-3 -> SDU 2-2 -> SDU 3-1

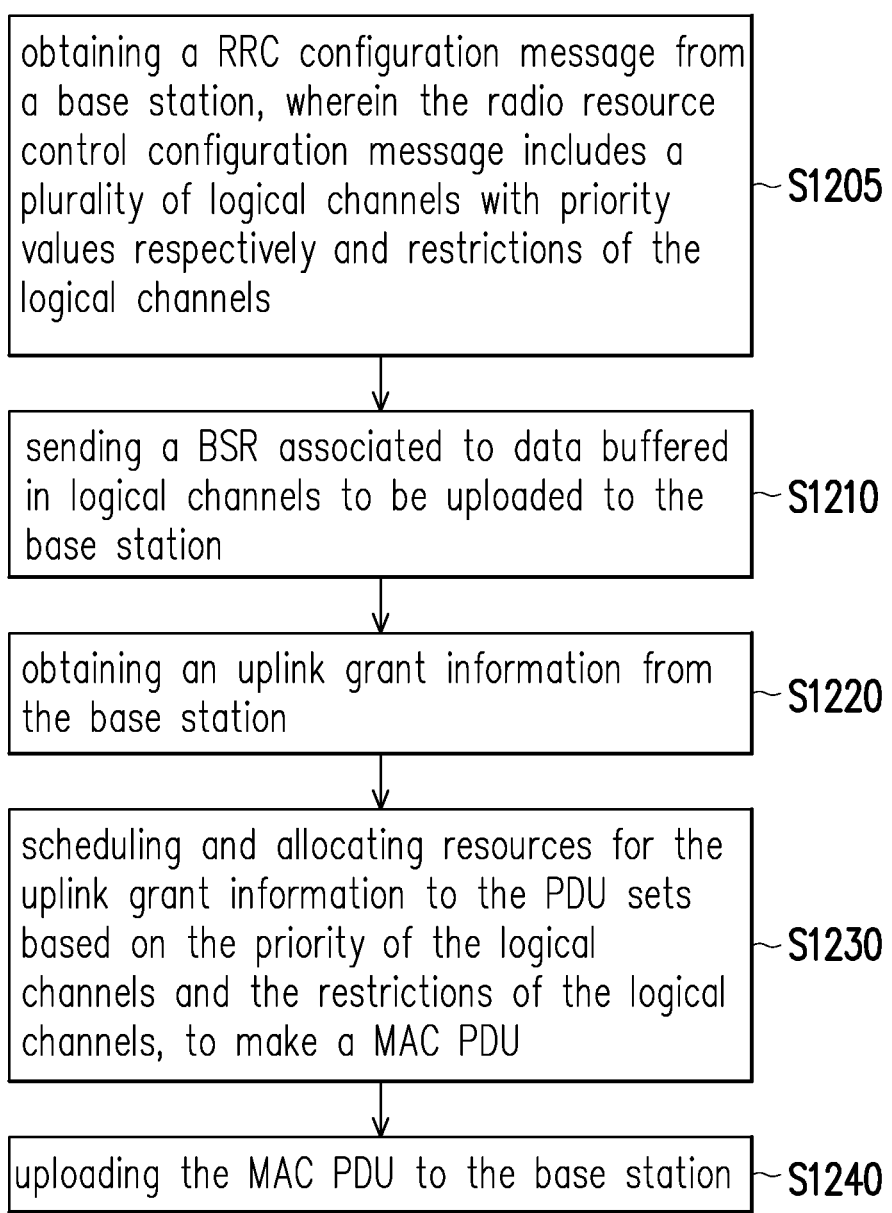

obtaining a RRC configuration message from a base station, wherein the radio resource control configuration message includes a plurality of logical channels with priority values respectively and restrictions of the logical channels — S1205 sending a BSR associated to data buffered in logical channels to be uploaded to the base station — S1210 obtaining an uplink grant information from the base station — S1220 scheduling and allocating resources for the uplink grant information to the PDU sets based on the priority of the logical channels and the restrictions of the logical channels, to make a MAC PDU — S1230 uploading the MAC PDU to the base station — S1240

FIG. 12

METHOD OF LOGICAL CHANNEL PRIORITIZATION AND DEVICE THEREOF

CROSS-REFERENCE TO RELATED APPLICATION

This application claims the priority benefit of U.S. provisional application Ser. No. 63/422,010, filed on Nov. 3, 2022. The entirety of the above-mentioned patent application is hereby incorporated by reference herein and made a part of this specification.

BACKGROUND

Technical Field

The technical field relates to methods of logical channel prioritization (LCP) in the wireless communication and a device thereof.

Background

In wireless transmission, whenever a user equipment (UE) performs a new transmission to a base station, a logical channel prioritization (LCP) procedure is applied by the UE. However, the medium access control (MAC) layer implementation device (i.e., MAC layer entity) of the UE cannot determine whether there are data contents of different importance in the data of the new transmission. Therefore, when the upload channels are congested, the MAC layer implementation device may only upload sequentially according to the sequence of the data to be uploaded, or discard part of the data to be uploaded.

SUMMARY

One of exemplary embodiments provides a method of logical channel prioritization performed by a user equipment, which comprising: obtaining a radio resource control configuration message from a base station, wherein the radio resource control configuration message includes a plurality of logical channels with priority values respectively; sending a buffer status report (BSR) associated to data buffered in logical channels to be uploaded to the base station; obtaining an uplink grant information from the base station; scheduling and allocating resources for the uplink grant information to data buffered in logical channels to be uploaded based on the priority of logical channels or based on at least one parameter, to make a medium access control (MAC) PDU, wherein the data buffered in logical channels to be uploaded are divided into a plurality of protocol data unit (PDU) sets, the at least one parameter are set in each of the PDU sets or in the logical channels to indicate transmission priorities among the PDU sets respectively; and uploading the MAC PDU to the base station.

One of exemplary embodiments provides a device of logical channel prioritization which including a processor. The processor is operable to: obtaining a radio resource control configuration message from a base station, wherein the radio resource control configuration message includes a plurality of logical channels with priority values respectively; sending a buffer status report (BSR) associated to data buffered in logical channels to be uploaded to the base station; obtaining an uplink grant information from the base station; scheduling and allocating resources for the uplink grant information to data buffered in logical channels to be uploaded based on the priority of logical channels or based on at least one parameter, to make a medium access control (MAC) PDU, wherein the data buffered in logical channels to be uploaded are divided into a plurality of protocol data unit (PDU) sets, the at least one parameter are set in each of the PDU sets or in the logical channels to indicate transmission priorities among the PDU sets respectively; and uploading the MAC PDU to the base station.

One of exemplary embodiments provides a method of logical channel prioritization, which comprising: obtaining a radio resource control configuration message from a base station, wherein the radio resource control configuration message includes a plurality of logical channels with priority values respectively and restrictions of the logical channels; sending a buffer status report (BSR) associated to data buffered in logical channels to be uploaded to the base station; obtaining an uplink grant information from the base station; scheduling and allocating resources for the uplink grant information to the PDU sets based on the priority of the logical channels and the restrictions of the logical channels, to make a medium access control (MAC) PDU; and uploading the MAC PDU to the base station.

Based on the embodiments, the methods for enhancement of logical channel prioritization (LCP) in the wireless communication and a device thereof in the embodiments of the present invention make the MAC layer implementation device (i.e., MAC layer entity) of the UE are able to distinguish priority values of each PDUs in the data to be uploaded, and the resources for the uplink grant information are scheduled and allocated to these sub-data (i.e., the PDUs) buffered in logical channels for making the MAC PDU, this MAC PDU is uplink transmitted to the base station. The data with higher priority may be uploaded quickly by the MAC layer implementation device, and the data with lower priority may be uploaded lately or even be discarded, so that the data with higher priority may not lost too much by the MAC layer implementation device of the UE, and the quality of the application corresponding to the data to be uploaded may be maintained easily.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

FIG. 1 is a schematic flow diagram of a UE performing uplink communication in wireless communication according to an embodiment of the present invention.

FIG. 6 is a flow chart illustrating a method of logical channel prioritization according to an embodiment of the present invention.

FIG. 12 is a flow chart illustrating a method of logical channel prioritization according to another embodiment of the present invention.

DETAILED DESCRIPTION OF DISCLOSED EMBODIMENTS

Figure 2:
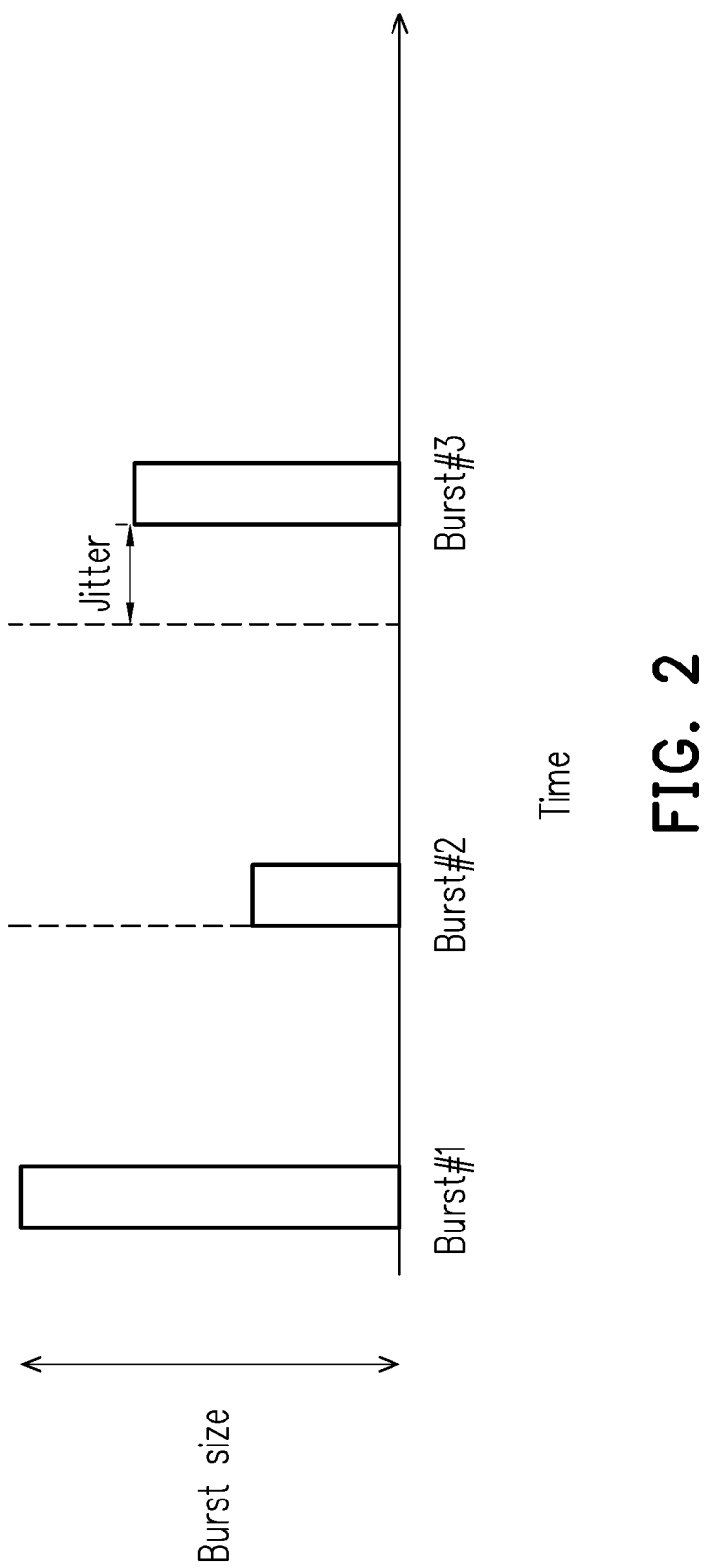
FIG. 2 is a schematic diagram illustrating a "data burst" mode according to an embodiment of the present invention.

FIG. 1 is a schematic flow diagram of a UE 100 performing uplink communication to a base station gNB 102 in wireless communication according to an embodiment of the present invention. At first, the UE 102 obtains a radio resource control (RRC) configuration message from the base station gNB 102 periodically or irregularly while in the wireless communication range of the base station gNB 102 (step S105). When the UE 102 wants to upload data with a new transmission to the base station gNB 102, the UE 102 generates a buffer status report (BSR) according to the volume of the data buffered in logical channels to be uploaded (step S110), and the UE transmits the BSR to the base station (step S120). After the BSR is received by the base station gNB 102, the base station gNB 102 evaluates situations of each transmission node (i.e., other UEs) and transmission channels in the current wireless communication network to generate an uplink grant information UG (step S130). The base station gNB 102 sends the uplink grant information to the UE 100 (step S140), so that the UE 100 knows which resources in wireless communication can be used for uploading data. In step S150, the UE 100 performs the LCP procedure according to the uplink grant information UG for scheduling and allocating resources for the uplink grant information to the PDU sets, so as to form the data to be uploaded into a MAC PDU for the uplink grant information UG. Then, in step S160, the UE 100 transfers the MAC PDU for the uplink grant information UG to the base station gNB 102 corresponding to the data to be uploaded, thus the data to be uploaded may be uploaded to the base station gNB 102 with these steps S105-S160.

However, when the UE 100 transmits the data to be uploaded to the base station gNB 102, the MAC layer implementation device of the UE 100 may not determine whether there are data contents with different importance in the data to be uploaded. While the channel is congested, the UE 100 needs to selectively transmit parts of the data to be uploaded, usually the last data of the data to be uploaded may be discarded because of the data order in the data to be uploaded. In the case of the application (for example, extended reality (XR), instant voice, video, VOIP, URLLC and other technologies) with the data to be uploaded of the wireless transmission has high data transmission rate and strict delay requirements, the quality of the application may be affected significantly while the discarded part of the data to be uploaded is an important part.

Because the resources of wireless communication are limited, while data transmission is performing, it is necessary to properly distribute the resources for the data to be transmitted associated with the protocol data units (PDUs) of the Media Access Control (MAC) layer, so that the UE 100 and the base station gNB 102 can transmit data more smoothly, and parts of the data to be transmitted with higher priority will be quickly transmitted.

In the applications with high data transfer rates and strict delay requirements (such as extended reality (XR) which including augmented reality (AR), virtual reality (VR), and mixed reality MR), live video streaming . . . etc.), parts of the data to be transmitted are important, while the other part of the data can be selectively discarded due to resource constraints. The discarded data may slightly affect the quality of mentioned applications (for example, slight block losses of image quality, freeze of the picture frame). But, if the discarded data is an important part of the data to be transmitted (for example, I-frame data of the live video streaming), the quality of mentioned application may be more significantly affected, for example, the video frame may be loess due to missing important data, some video frame in the screen are missing . . . etc.

In the 3rd Generation Partnership Project (3GPP) communication protocol, it is evolved from the Long Term Evolution (LTE) architecture of 4G communication to the New Radio (NR) structure of 5G communication, and it is hoped that the 5G NR communication protocol can be adapted to the specific application described above, for example, the reference material TR 38.835 "Study on XR enhancements for NR" published in March 2023 are described for extended reality enhancements. In the reference material TR 38.835, it has a "data burst" mode for uplink wireless communication. FIG. 2 is a schematic diagram illustrating a "data burst" mode according to an embodiment of the present invention. A "data burst" mode is a mode for an application that wants to uplink transmit a large amount of data in a short period of time. These large amounts of data can be composed of one or more data protocol data units (PDUs) sets, and each data burst (marked with Burst #1, Burst #2, and Burst #3) can consist of multiple PDU sets buffered in logical channels. Each of the PDU sets buffered in logical channels are composed with a plurality of PDUs. Each data burst may also be jittered, for example, there is jitter of data burst Burst #3, so that the data bursts are not strictly periodically. It can be seen from FIG. 2 that while each data burst is sent, the data volume of the data burst (called, Burst size in FIG. 2) will be adjusted according to the amount of data to be uploaded at different time, for example, different Burst size for each data burst is shown in FIG. 2.

Figure 3:
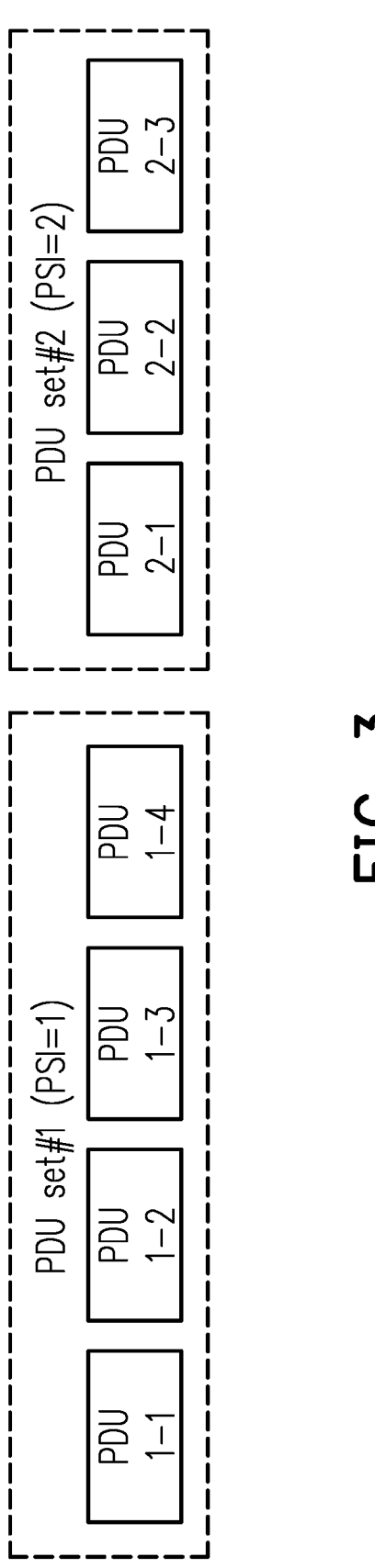
FIG. 3 is a schematic diagram of a PDU set according to an embodiment of the present invention.

FIG. 3 is a schematic diagram of PDU sets according to an embodiment of the present invention. The PDU set in FIG. 3 has a plurality of information and identifiers. For example, each PDU set has its own PDU set sequence number (SN), for example, the PDU set #1 and the PDU set #2 in FIG. 3. Each PDU set has its own corresponding PDU set importance information PSI, and the PSI in this embodiment is suitable for identifying the relative importance of the specific PDU set in the uplink stream (for example, the QoS flow) compared with other PDU sets.

For example, the data in the PDU set #1 may be I frame data in the video streaming technology, and the data in the PDU set #2 may be P frame data in the video streaming technology. Because the importance of I frame data is greater than P frame data in the streaming video technology, for example, so the value of PSI associated to the PUS set

1 in FIG. 3 is "1", and the value of PSI associated to the PUS set #2 in FIG. 3 is "2" while lower values of PSI shall indicate a higher importance PDU Set. The value of PSI associated to the PUS set #1 "1" is lower than the value of PSI associated to the PUS set #2 "2", thus the importance of the PUS set #1 is higher than the importance of the PUS set #2. In other words, the lower the value of PSI is, the importance of the PDU set is.

When the uplink transmission channels are congested and it is talking into account that the resources of wireless communication will be exhausted, the UE 100 can use the parameters: the PSI of each PDU set to selectively discard these PDU sets. In this embodiment, the importance of data in the PDU sets (i.e., the PSI of each PDU set) can be considered during transmission and the LCP procedure are performed, the higher priority, more important, and more urgent data can be transmitted quickly than the lower priority, less important, and less urgent data with and the chance of the higher priority, more important, and more urgent data being discarded can be reduced. The PSI associated to each PDU set can be distinguished by the UE 100 or the base station gNB 102. There are multiple PDUs in each PDU set, these PDUs also have corresponding sequence numbers, for example, PDU Sequence Number within a PDU Set. For example, PDU set #1 has PDUs 1-1, 1-2, 1-3 and 1-4, and PDU set #2 has PDU 2-1, 2-2 and 2-4.

Figure 4:
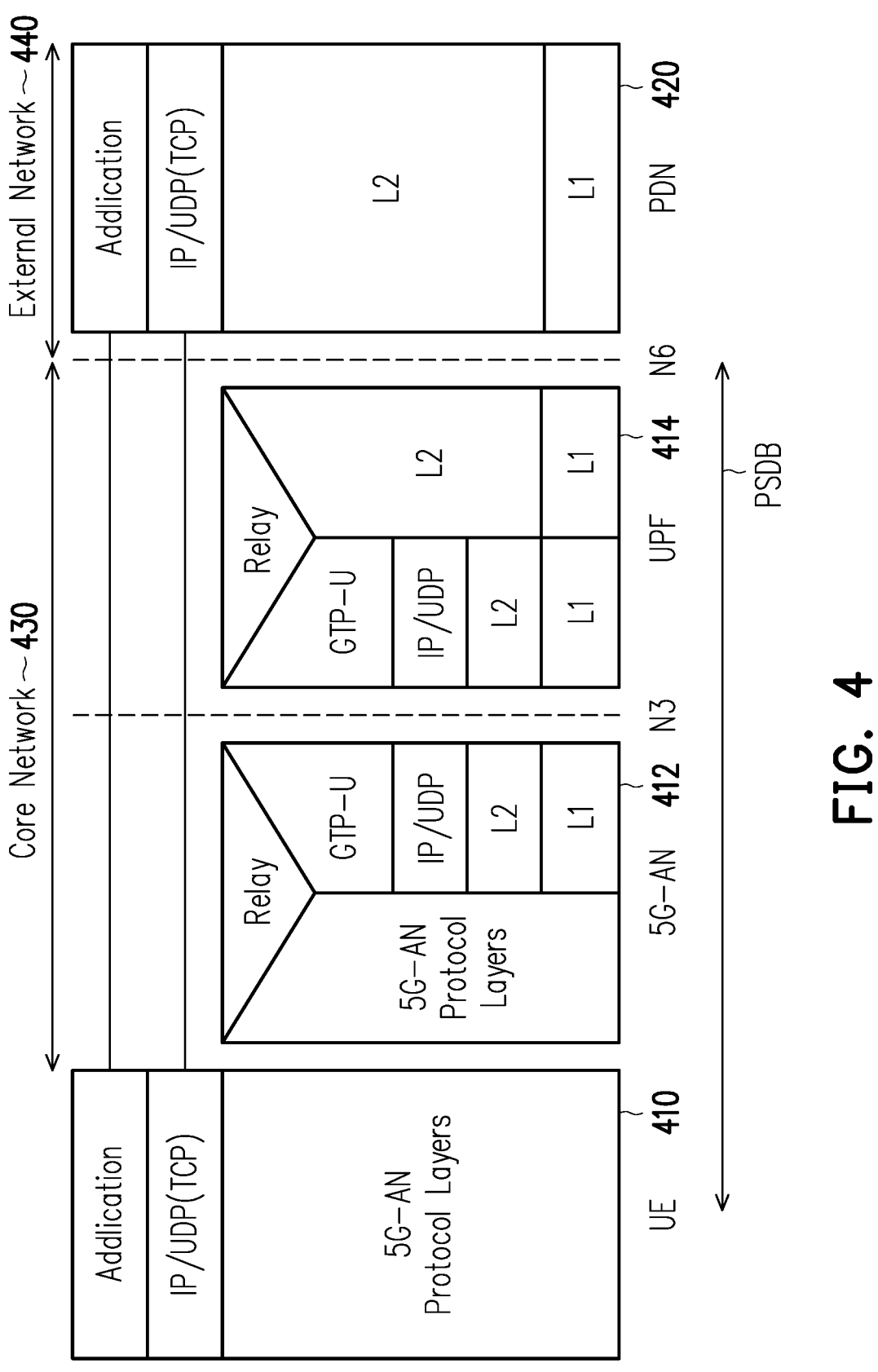
FIG. 4 is a schematic diagram illustrating a PDU set delay budget (PSDB) according to an embodiment of the present invention.

FIG. 4 is a schematic diagram illustrating a PDU set delay budget (PSDB) according to an embodiment of the present invention. The PSDB is an estimated time period parameter for transmitting a default PDU set from the UE 410 to the user plane Function (UPF) device 414 in the core network 430 through the wireless 5G access network point 5G-AN 412.

On the other hand, some data in the applications may be very important and have low-latency characteristics, so some PDU sets are set with a remaining delivery time (referred to as RDT) as one of its parameters. The remaining delivery time RDT of the PDU of a PDU set can be determined, for example, according to the remaining discardTimer values of the corresponding PDCP SDU. The remaining delivery time RDT is a time period for a PDU set for the remaining transmission time of the PDU set transmitted from the UE to the base station gNB in order to determine whether the data needs to be delivered as soon as possible. If the UE 410 can recognize the RDT of the PDU set, the UE 410 can know that the data in the PDU set is time-sensitive, and it is necessary to deliver the PDU set to the UPF 414 in the core network as soon as possible within the time specified by the RDT, so that the aforementioned applications can obtain better service quality.

If it is desired to make 5G wireless communication technology more suitable for XR technology, in terms of pose control, it is necessary to have periodic (eg, 4 ms) and fixed-size data transmission, and its quality-of-service (QoS) has low latency, low data transmission rate and high reliability . . . etc., and can be supported by the configured grant mechanism. In terms of video transmission, it is necessary to have variable picture size and variable picture update rate, and it can distinguish the data in the video into I frame and P frame. The QoS corresponding to the I-frame data has low latency, high data transmission rate, and high reliability. The QoS corresponding to P-frame data has low latency, high data transmission rate and medium reliability. So enhanced dynamic grant mechanism or enhanced configured grant mechanism can support the video transmission. In terms of audio transmission, periodic (eg, 20 ms) data transmission is required, and its QoS has moderate delay, low information transmission rate and moderate reliability . . . etc, and can be supported by the configured grant mechanism.

Figure 5:
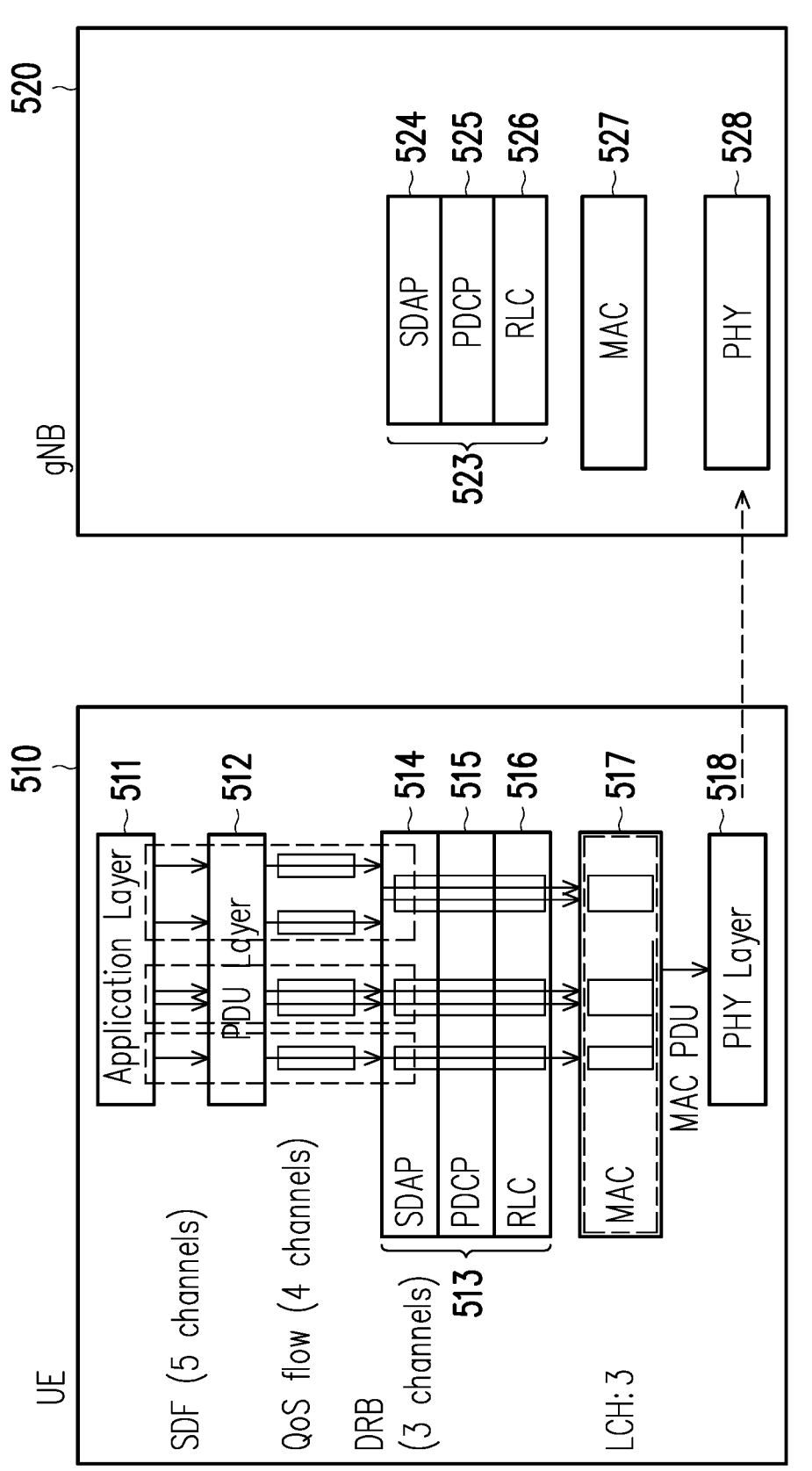
FIG. 5 is a schematic diagram of uplink communication between a UE and a base station in wireless communication according to an embodiment of the present invention.

FIG. 5 is a schematic diagram of uplink communication between a UE 510 and a base station gNB 520 in wireless communication according to an embodiment of the present invention. The hardware structure of the UE 100 may include a processor for implementing a method described in this disclosure, a non-removable memory, a removable memory, a display/touchpad, a keyboard, a speaker/microphone, a power source, a GPS chipset, peripheral devices, a transceiver, and an antenna. As for classification by network functional models, the UE 510 in FIG. 5 has an application layer 511, a PDU layer 512, a data link layer associated with data radio bearer (DRB) 513, a MAC layer 517, and a physical layer 518. The base station gNB 520 also has a data link layer associated with DRB 523, a MAC layer 527, and a physical layer 528. These layers are implemented by the hardware structure (i.e., the processor) of the UE 510 or the hardware structure of the base station gNB 520.

The application layer 511 provides the data to be uploaded to the PDU Layer 512 through 5 service data flows. The PDU Layer 512 filters the 5 service data flows into 4 QoS flows. The service data adaptation protocol (SDAP) layer 514 maps the 4 QoS flows into 3 DRBs. The mapping between a DRB and logical is one-to-one through a packet data convergence protocol (PDCP) layer 515, and a radio link control (RLC) layer 516. These layers 514 to 516 are to add corresponding packet headers to these PDUs to prepare for continuation transmission. The layer implementation device (i.e., MAC layer entity) implements the MAC layer 517. The MAC layer 517 performs logical channel prioritization (LCP) procedure to multiplex the one or more MAC SDUs into a MAC PDU for an uplink grant. The physical layer 518 transmits the MAC PDUs to the base station gNB 520, and uses the corresponding protocols and application devices in the base station gNB 520 (for example, the physical layer 528, the MAC layer 527, the SDAP layer 524, the PDCP layer 525, the RCL layer 526) correspondingly parses the MAC PDUs into the packet, so as to receive the data to be uploaded by the base station gNB 520.

The device and corresponding method for enhancing the LCP procedure in the wireless communication described in the embodiment of the present invention can be implemented in the MAC layer 517 in the UE 510, and the UE 510 will identify and distinguish the PDUs when performing new transmissions and executing LCP related parameters (for example, PSI associated to each PDU set, remaining delivery time, etc.) to determine the importance of each PDU set and whether there are higher priority, more important, and more urgent data in these PDU sets. The MAC layer implementation device is packaged the scheduled PDU sets into MAC PDUs to upload to the base station gNB 520, and the lower priority, less important, and less urgent data may be uploaded lately or even be discarded, so that the data with higher priority may not lost too much by the MAC layer implementation device of the UE, and the quality of the application corresponding to the data to be uploaded may be maintained easily.

FIG. 6 is a flow chart illustrating a method of logical channel prioritization according to an embodiment of the present invention. Besides for eMBB (enhanced Mobile Broadband enhanced mobile broadband), URLLC (Ultra-Reliable and Low Latency Communications ultra-reliable and low-delay communication) and eMTC (enhanced machine-type communication enhancement), for example, the MAC layer implementation device located in the UE in the embodiment of the present invention is designed for the enhancements of augmented reality technology or video streaming technology, and the requirements for the PSI or other parameters of the PDU sets may be different. In step S605 of FIG. 6, the UE obtains a RRC configuration message from a base station. The RRC configuration message includes a plurality of logical channels with priority values respectively. The priority with an increasing priority value indicates a lower priority level for transmission. In step S610, the UE sends a BSR associated to data to be uploaded to the base station. In step S620, the UE obtains an uplink grant information UG from the base station. In the embodiment, the data to be uploaded are divided into a plurality of PDU sets.

In step S630 of FIG. 6, the MAC layer implementation device of the UE schedules and allocates resources for the uplink grant information UG to data buffered in logical channels to be uploaded based on the priority of logical channels or based on the at least one parameter to make a MAC PDU by implementing the enhanced LCP procedure. The data buffered in logical channels to be uploaded are divided into a plurality of protocol data unit (PDU) sets, and the at least one parameter are set in each of the PDU sets or in the logical channels to indicate transmission priorities among the PDU sets respectively. The enhanced LCP procedure in the embodiment realizes the scheduling and sequencing of MAC SDUs in a manner different from the order of the MAC SDUs. Then, in step S640 of FIG. 6, the UE uploads the MAC PDU to the base station.

In detail, the at least one parameter may set in each of the PDU sets in some phases, and in at least one parameter may set in the logical channels in other phases. In the embodiment, the step S630 of FIG. 6 may be performed based on the at least one parameter set in each of the PDU sets, or the step S630 of FIG. 6 may be performed based on the at least one parameter set in the logical channels. In the embodiment, the at least one parameter of a specific PDU set in the PDU sets includes one of: a PDU set importance message for indicating the transmission priorities of the specific PDU set among the PDU sets; a remaining delivery time for estimating whether the specific PDU set to be transmitted to the base station in the remaining delivery time; and, a score associated to the PDU set importance message and the remaining delivery time. The details of the parameter of PDU sets are described in these embodiments below.

Figure 7:
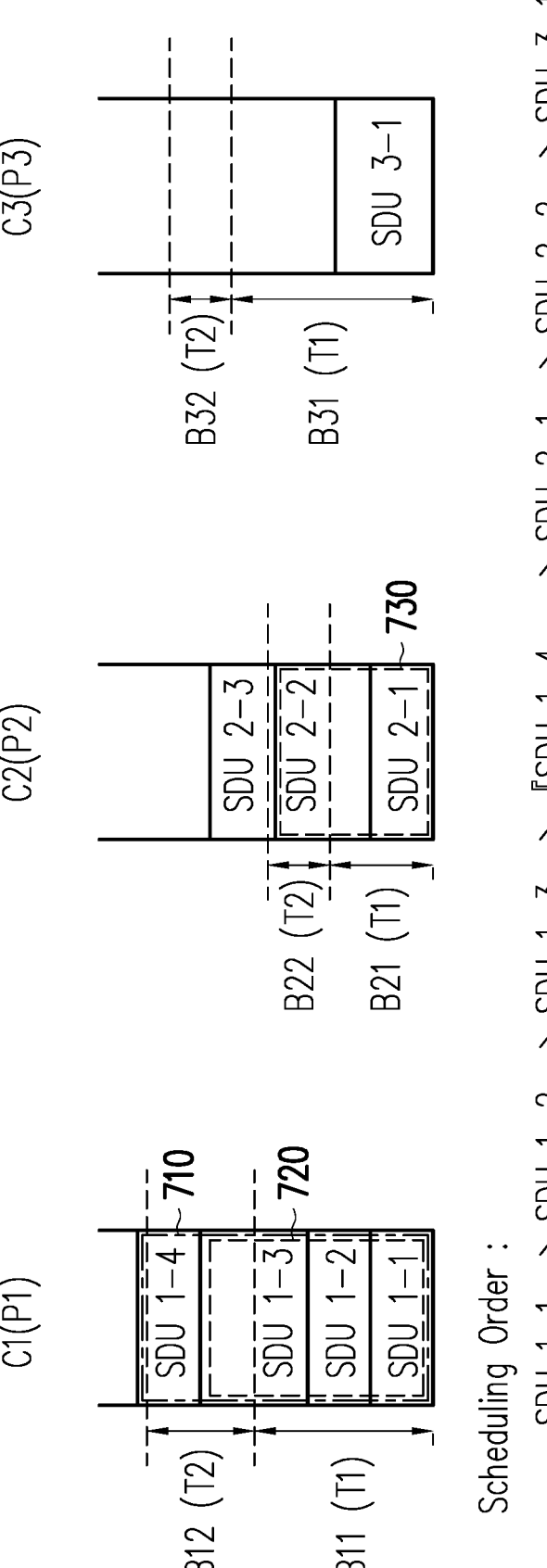
FIG. 7 is a schematic diagram illustrating scheduling configuration of the PDU sets based on according to a first embodiment of the present invention.
Figure 8:
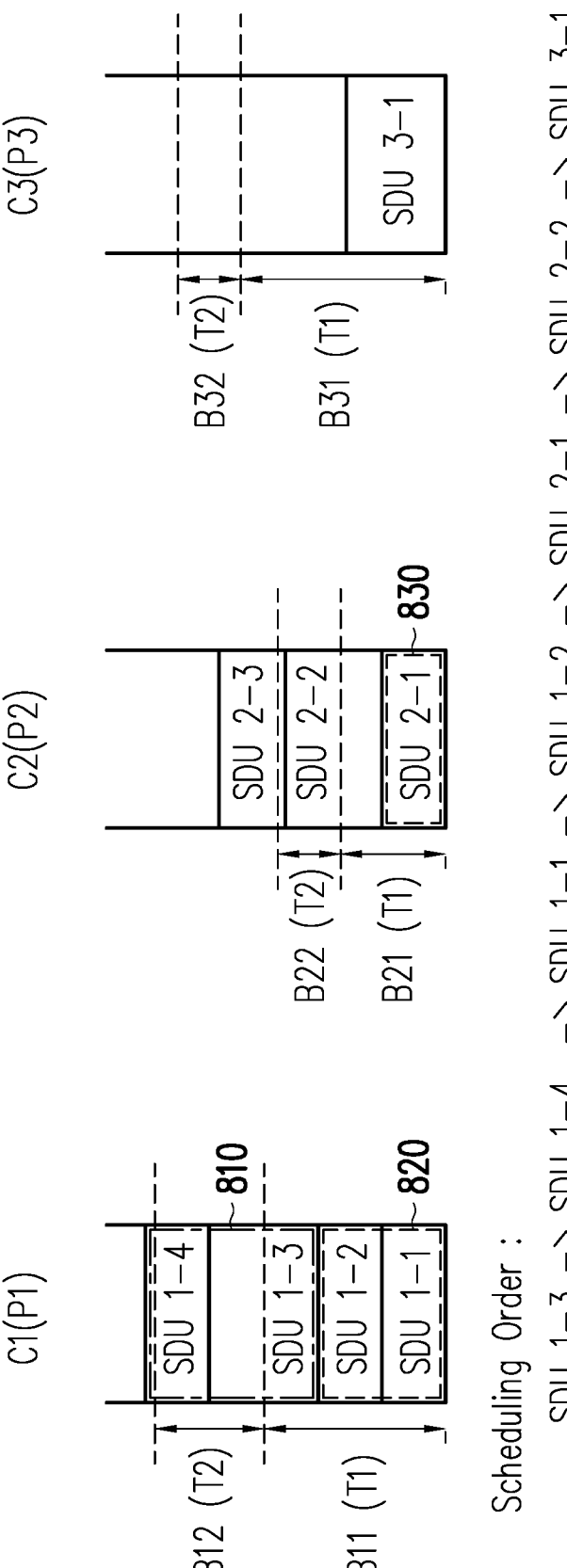
FIG. 8 is a schematic diagram illustrating scheduling configuration of the PDU sets according to the second embodiment of the present invention.
Figure 9:
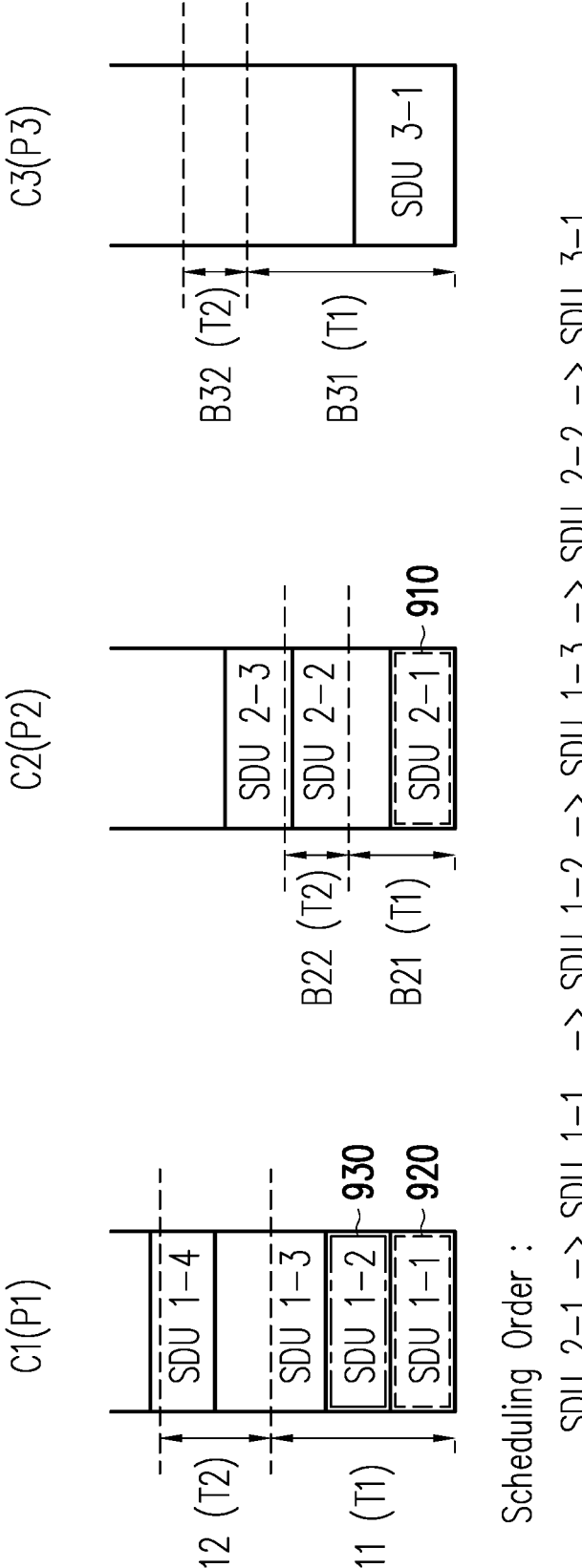
FIG. 9 is a schematic diagram illustrating scheduling configuration of the PDU sets according to a third embodiment of the present invention.
Figure 10:
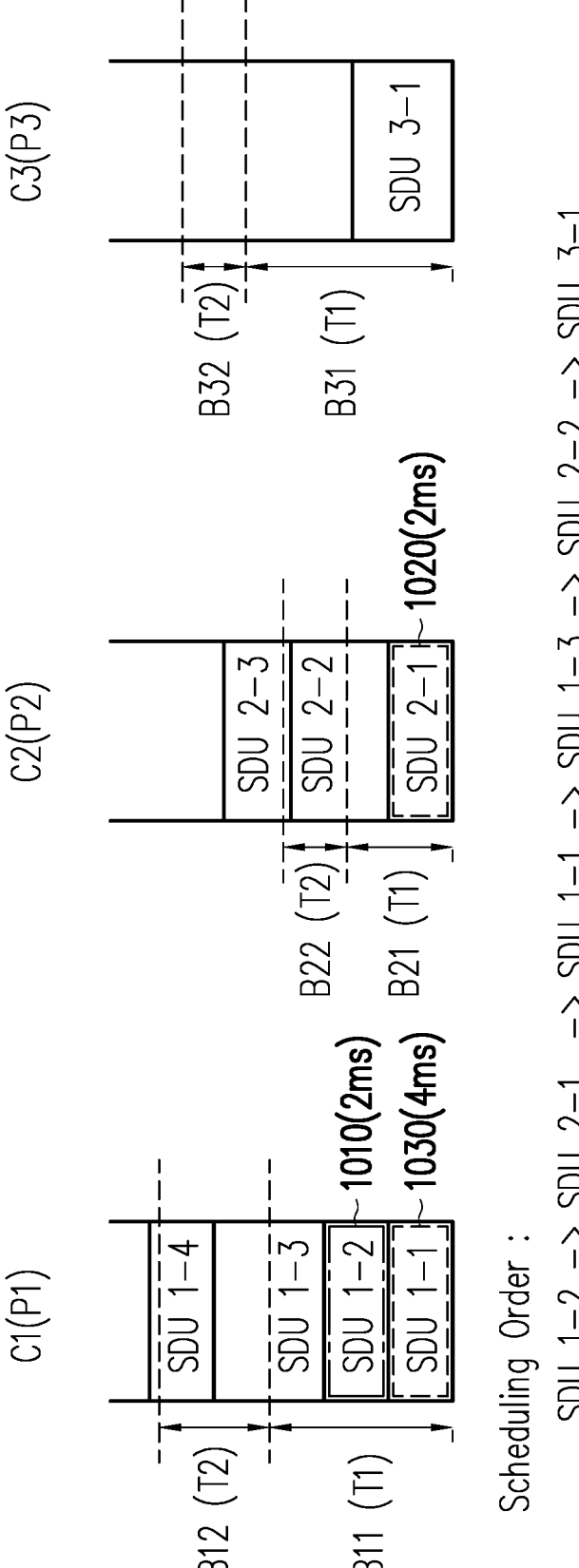
FIG. 10 is a schematic diagram illustrating scheduling configuration of the PDU sets according to a fourth embodiment of the present invention.
Figure 11:
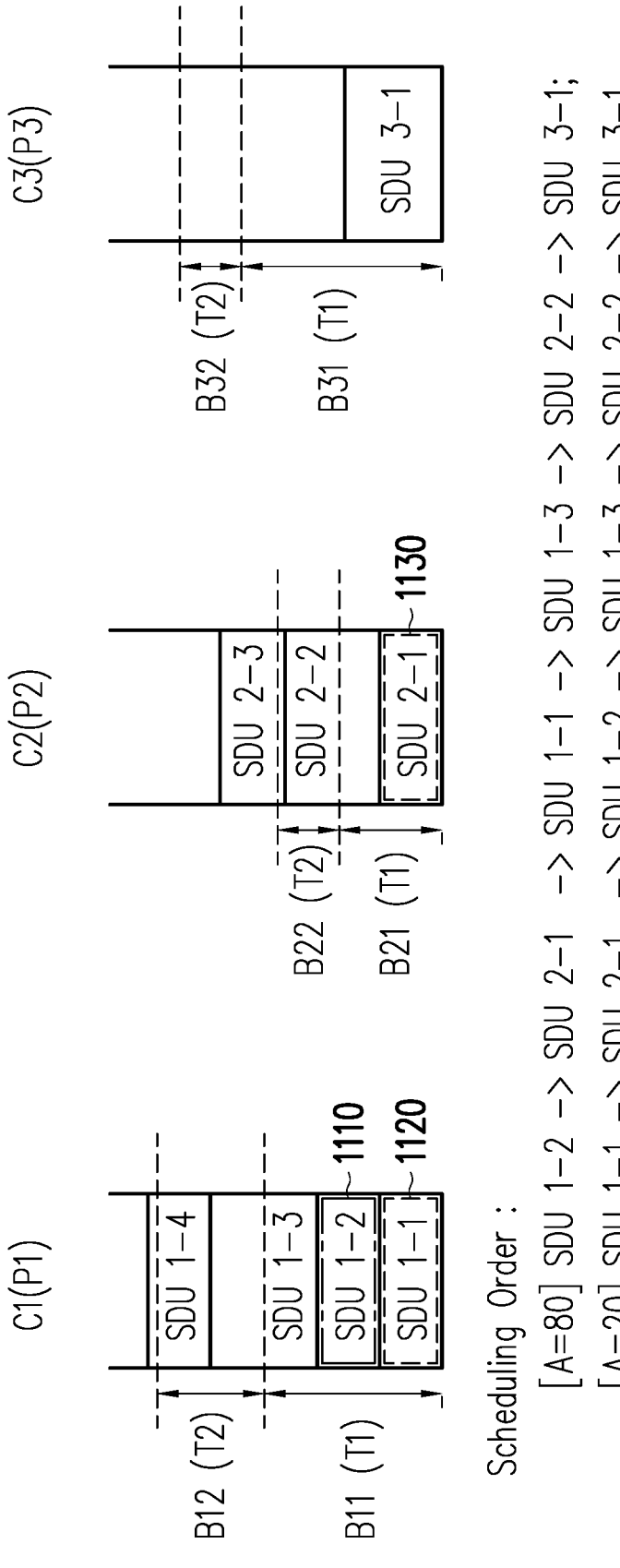
FIG. 11 is a schematic diagram illustrating scheduling configuration of the PDU sets according to the fifth embodiment of the present invention.

In accordance with the first embodiment of FIG. 7, the scheduling of PDU sets is implemented based on the PSI associated to the PDU sets; in the second embodiment of FIG. 8, the third embodiment of FIG. 9, and the fourth embodiment of FIG. 10, the scheduling of PDU sets is implemented based on the remaining delivery time RDT and the PSI associated to the PDU sets; in the fifth embodiment of FIG. 11, the scheduling of PDU sets are implemented based on the score calculated by the remaining delivery time RDT and the PSI associated to the PDU sets.

Parameters related to various embodiments of the present invention are described here. Each logical channel Cj corresponds to the bucket size value Bj, and the bucket size value Bj is designed for fairness among multiple logical channels in the LCP procedure. The bucket size value Bj is incremented by the product of the prioritized bit rate of this logical channel multiplied by a specific time period. The "j" represents the number of logical channels. The bucket size value Bj is related to the bucket size duration corresponding to each logical channel.

Regarding the bucket size value Bj, the MAC layer implementation device increases a product of the prioritized bit rate (PBR) associated to each logical multiplied by a time period T before the instance of each LCP program appears. The time period T is the time elapsed since the bucket size value Bj was last incremented. If the bucket size value Bj is greater than the maximum bucket size of the logical channel Cj (i.e., the product of the prioritized bit rate multiplied by the bucket size duration BSD), the bucket size value Bj will be set to the value of the aforementioned bucket size. In this embodiment, the value of the bucket size Bj can be negative.

FIG. 7 is a schematic diagram illustrating scheduling configuration of the PDU sets based on according to a first embodiment of the present invention. In the first embodiment of the present invention, the MAC layer implementation device of the UE allocates wireless resources to the PDU sets buffered in the logical channels selected by the uplink grant information UG in a decreasing priority order, and the bucket size value Bj in the uplink grant information UG is greater than zero. If the selected logical channel is used for a specific application (e.g., XR), the MAC layer implementation device will allocate resources to the MAC SDUs on the selected logical channel whose PSI are smaller than a pre-configured PDU set importance threshold regardless of an allowed amount for the uplink grant on the selected logical channel. In other words, a new phase is in a decreasing priority order without the limitation of bucket size value Bj>0. Then, the allocated resources are deducted from the total capacity of the MAC SDUs in the bucket size value Bj of each logical channel. If there are remaining wireless resources, the remaining wireless resources will be allocated to the selected logical channel for the uplink grant with the next lower priority in strict descending priority order.

In FIG. 7, the logical channels C1, C2 and C3 respectively have a priority value P1, a priority value P2 and a priority value P3. The smaller the values of the priority values P1, P2, and P3 corresponding to the logical channels C1, C2, and C3, the more important the data in the corresponding logical channels is, and theoretically, the earlier the data needs to be uploaded. The logical channels C1, C2 and C3 respectively have corresponding bucket-sized values B11, B21 and B31 after the time period T1 and corresponding bucket-sized values B12, B22 and B32 after the time period T2. It can be clearly seen from FIG. 7 that the logical channel C1 has multiple MAC SDU 1-1, SDU 1-2, SDU 1-3 and SDU 1-4, the logical channel C2 has multiple MAC SDU 2-1, SDU 2-2 and SDU 2-3, and the logical channel C3 has MAC SDU 3-1.

As for the LCP procedure, the time period T1 and the time period T2 are the time periods that can be uploaded in each logical channel. The MAC SDUs corresponding to the time period T1 can be uploaded earlier than the MAC SDUs corresponding to the time period T2. For example, the bucket size value B12 of logical channel C1 in FIG. 7 can accommodate MAC SDU 1-1, 1-2, 1-3 and 1-4 (rectangle mark 710), but the bucket size value B11 can accommodate MAC SDU 1-1, 1-2, and 1-3 (rectangle mark 720), but cannot accommodate SDU 1-4 (rectangle mark 710); the bucket size value B21 of logical channel C2 can accommodate MAC SDU 2-1 and 2-2 (rectangular mark 730), and the bucket size value B31 of logical channel C3 can accommodate MAC SDU 3-1. Therefore, according to the normal LCP procedure, the order in which the data to be uploaded in the logical channels C1, C2 and C3 is allocated resources in the following order: SDU 1-1, SDU 1-2, SDU 1-3, SDU 2-1, SDU 2-2 and SDU 3-1. Since bucket size value B11 cannot accommodate MAC SDU 1-4 (rectangular mark 720) and bucket size value B21 cannot accommodate MAC SDU 2-3 after the time period T1, MAC SDU 1-4 and 2-3 may be allocated excess wireless resources after the MAC SDUs in the aforementioned order are allocated after the time period T1.

On the other hand, the scheduling and allocating resources to the MAC SDUs is based on the PSI associated to PDU set in the first embodiment of the present invention, because the MAC SDU 1-1, 1-2, 1-3, 1-4 and 2-1 are all set to have the same PSI in this embodiment, the value of this PSI is less than the pre-configured PDU set importance threshold, and the PSIs of the other MAC SDUs are all greater than the pre-configured PDU set importance threshold. Therefore, according to the LCP procedure of the first embodiment of the present invention, the scheduled order in which the data to be uploaded in the logical channels C1, C2 and C3 is allocated resources as follows: SDU 1-1, SDU 1-2, SDU 1-3, "SDU 1-4", SDU2-1, SDU 2-2 and SDU 3-1. That is to say, because the PSI associated to "SDU 1-4" shows that the data in "SDU 1-4" has a higher priority for uplink transmission, so this embodiment jumps into the scheduled order in advance of "SDU 1-4" to be sent as soon as possible, so as to enhance the quality of the application. In other words, a first PDU set on a selected logical channel is uploaded to the base station for the uplink grant while a value of a first PDU set importance message associated with the first PDU set is smaller than a pre-configured PDU set importance threshold regardless of an allowed amount for the uplink grant on the selected logical channel.

FIG. 8 is a schematic diagram illustrating scheduling configuration of the PDU sets according to the second embodiment of the present invention. Comparing with FIG. 8 and FIG. 7, in the second embodiment of the present invention, the scheduling and allocating resources is performed based on the channel priorities of the logical channels in a decreasing priority order, a second PDU set on a selected logical channel is uploaded to the base station for the uplink grant while a value of a second PDU set importance message associated with the second PDU set is smaller than a pre-configured PDU set importance threshold regardless of an allowed amount for the uplink grant on the selected logical channel, and the scheduling and allocating resources is based on the remaining delivery time of each of the PDU sets in an increasing order on the selected logical channel. In detail, MAC SDU 1-1 to 1-4 each have their respective remaining delivery time RDT, the remaining delivery time RDT of PDU sets SDU 1-3 to 1-4 (rectangle mark 810) is smaller than the remaining delivery time RDT of PDU sets SDU 1-1 to 1-2 (rectangle mark 820). The remaining delivery time RDT of the PDU set SDU 2-1 (rectangular mark 830) also has the corresponding remaining delivery time RDT. The PDU sets SDU 2-2 and 2-3 have no corresponding remaining delivery time.

A third PDU set are uploaded to the base station quicker than a fourth PDU set while a value of a third remaining delivery time associated with the third PDU set is smaller than a value of a fourth remaining delivery time associated with the fourth PDU set. Since the smaller remaining delivery time RDT, the corresponding PDU set of the remaining delivery time RDT needs to be uploaded to the base station gNB as soon as possible, and considering that the MAC SDU 1-1 to 1-4 are located in the logical channel C1 and the MAC SDU 2-1 is located in logical channel C2, according to the LCP procedure of the second embodiment of the present invention, the scheduled order in which the data to be uploaded in the logical channels C1, C2 and C3 is allocated resources as follows: SDU 1-3→SDU 1-4→SDU 1-1→SDU 1-2→SDU 2-1→SDU 2-2→SDU 3-1. In other words, based on the RDT associated to MAC SDU 1-3 and 1-4 is less than the RDT associated to MAC SDU 1-1, SDU 1-2, the MAC SDU 1-3 and SDU 1-4 are scheduled and uploaded quickly than the MAC SDU 1-1 and SDU 1-2, and then the MAC SDU 1-1 and SDU 1-2 and other MAC SDUs are scheduled and uploaded after the MAC SDU 1-3 and SDU 1-4. One scenario is also applicable to the second embodiment of the present invention. The remaining PDU Set delivery time between different MAC SDUs can be also represented as a new QoS parameter for delay (e.g, PSDB) difference between couple of flows. The delay difference is a positive or negative number. For example, the PSDB of MAC SDU 1-3 and 1-4 is 15 ms, the PSDB of MAC SDU 1-1 and 1-2 is 50 ms, so the delay difference is 15 ms-50 ms=35 ms. Then the MAC SDU 1-3 and 1-4 will be sent quickly than the MAC SDU 1-1 and 1-2.

FIG. 9 is a schematic diagram illustrating scheduling configuration of the PDU sets according to a third embodiment of the present invention. Comparing with FIG. 9 and FIG. 7, in the third embodiment of the present invention, the scheduling and allocating resources is performed on the PDU sets based on the remaining delivery time RDT associated to the PDU sets, and the PSI associated to the PDU sets and the channel priority of the logical channels are not considered. The PDU sets buffered in the logical channels are scheduled and allocated resources based on the remaining delivery time of each of the PDU sets in an increasing order. The MAC SDU 2-1 (rectangular mark 910) has the smallest RDT compared to other MAC SDUs, the MAC SDU 1-1 (rectangular mark 920) has the second smallest RDT compared to other MAC SDUs, and the MAC SDU 1-2 (rectangular mark 930) has the third smallest RDT compared to other MAC SDUs.

Since the smaller remaining delivery time RDT, the corresponding PDU set of the remaining delivery time RDT needs to be uploaded to the base station gNB as soon as possible, and there is no consideration for the channel priorities of the logical channels, according to the LCP procedure of the third embodiment of the present invention, the scheduled order in which the data to be uploaded in the logical channels C1, C2 and C3 is allocated resources as follows: SDU 2-1→SDU 1-1→SDU 1-2→SDU 1-3→SDU 2-2→SDU 3-1. In other words, the MAC SDU 2-1 is the first one to be scheduled and uploaded to the base station gNB, and then the other MAC SDUs are scheduled and uploaded after MAC SDU 2-1 based on the RDT associated to PDU sets in an increasing order. A fifth PDU set is uploaded to the base station quicker than a sixth PDU set while a value of a fifth remaining delivery time associated with the fifth PDU set is smaller than a value of a sixth remaining delivery time associated with the sixth PDU set, or, wherein a seventh PDU set is uploaded to the base station quicker than an eighth PDU set while a value of a seventh remaining delivery time associated with the seventh PDU set is smaller than a pre-configured remaining delivery time threshold and a value of an eighth remaining delivery time associated with the eighth PDU set is larger than the pre-configured remaining delivery time threshold. For example, only the MAC SDU 2-1 (rectangular mark 910) has the RDT smaller than the pre-configured remaining delivery time threshold, and the other MAC SDUs have the RDT larger than the pre-configured remaining delivery time threshold. The scheduled order in which the data to be uploaded in the logical channels C1, C2 and C3 is allocated resources as follows: SDU 2-1→SDU 1-1→SDU 1-2→SDU 1-3→SDU 2-2→SDU 3-1. In other words, the MAC SDU 2-1 is the first one to be scheduled and uploaded to the base station gNB, and then the other MAC SDUs are scheduled and uploaded after MAC SDU 2-1 based on the channel priority of logical channels in a decreasing priority order.

FIG. 10 is a schematic diagram illustrating scheduling configuration of the PDU sets according to a fourth embodiment of the present invention. Comparing with FIG. 10 and FIG. 7, in the fourth embodiment of the present invention, the at least one parameter are the remaining delivery time for each of the PDU sets and the PDU set importance message for each of the PDU sets, and the scheduling and allocating resources is performed on the PDU sets based on the remaining delivery time of each of the PDU sets in an increasing order. The MAC SDU 1-2 (rectangle mark 1010) and the MAC SDU 2-1 (rectangle mark 1020) have the smallest RDT (for example, 2 ms) compared with other MAC SDUs, and the MAC SDU 1-1 (rectangle mark 1030) has the second smallest RDT (e.g., 4 ms) compared to other MAC SDUs. The MAC SDU 1-1, SDU 1-2 and SDU 2-1 all have a PDU set importance message smaller than a pre-configured PDU set importance threshold. The MAC PDUs in an increasing remaining PDU Set delivery time order, and the MAC PDUs whose PSI are smaller than a pre-configured importance threshold on the selected logical channel.

In the fourth embodiment of the present invention, a ninth PDU set is uploaded to the base station quicker than a tenth PDU set while a value of a ninth remaining delivery time associated with the ninth PDU set is smaller than a value of a tenth remaining delivery time associated with the tenth PDU set, and a value of a ninth PDU set importance message associated with the ninth PDU set is smaller than a pre-configured PDU set importance threshold. The MAC PDUs in an increasing remaining PDU Set delivery time order, and the MAC PDUs whose PSI are smaller than a pre-configured importance threshold on the selected logical channel. In other words, the RDT associated to the PDU set is first considered. If there are two PDU sets with the same RDT, then the channel priorities of the logical channels are considered. The MAC SDU 1-2, SDU 2-1, and SDU 1-1 corresponding to the smaller remaining delivery time RDT need to be uploaded to the base station gNB as quickly as possible in the scheduled order, and the channel priorities of the logical channels should be considered, according to the LCP procedure of the fourth embodiment of the present invention, the scheduled order in which the data to be uploaded in the logical channels C1, C2 and C3 is allocated resources as follows: SDU 1-2→SDU 2-1→SDU 1-1→SDU 1-3→SDU 2-2→SDU 3-1. Then, when there are other redundant wireless resources, the redundant wireless resources will be allocated to the MAC SDU 1-4 and SDU 2-3. In other words, if the scheduled order is performed according to the RDT and the channel priorities of the logical channels, the MAC SDU 1-2 is scheduled to be uploaded to the base station gNB first, the MAC SDU 2-1 is scheduled to be uploaded to the base station gNB second, and then other MAC SDU 1-1, 1-3, 2-2 and 3-1 are scheduled to be uploaded to the base station gNB.

FIG. 11 is a schematic diagram illustrating scheduling configuration of the PDU sets according to the fifth embodiment of the present invention. Comparing with FIG. 11 and FIG. 7, in the fifth embodiment of the present invention, the scheduling and allocating resources is performed on the PDU sets buffered in logical channels based on the scores calculated from the PSI and RDT associated to each of the PDU sets in an increasing score order. An eleventh PDU set is uploaded to the base station quicker than a twelfth sixth PDU set while a value of an eleventh score associated with the eleventh PDU set is smaller than a value of a twelfth score associated with the twelfth PDU set.

The equation (1) provides the calculation method of the score associated to each PDU sets, "PSI" indicates the PSI associated to each PDU set, "RDT" indicates the RDT associated to each PDU set, and "A" indicates a scale parameter that adjusts the ratio between "PSI" and "RDT" in equation (1):

$$\text{Score } S = A\ \%\times\text{PSI} + (1-A\ \%)\times\text{RDT} \tag{1}$$

The score of each of the PDU sets is calculated by a product of a percentage of a scale parameter multiplied by a value of the PDU set importance message plus a product of a number multiplied by a value of the remaining delivery time of the PDU set, wherein the number is a value obtained by subtracting the percentage of the scale parameter from 1. The scale parameter is configured by the base station. In the embodiment, if the base station gNB detects that the load of the uplink grant information UG is heavy, the base station gNB may set the scale parameter A in equation (1) as a larger value. Therefore, the more important PDU sets are sent as often as possible. Also, less important PDU sets may be delayed or discarded if the corresponding remaining delivery time runs out. While the score associated to the specific PDU set is lower, the priority of the specific PDU set is higher.

Assuming the scale parameter A is 80, and the score associated to the MAC SDU 1-2 (rectangular mark 1110) is "1"; the score associated to MAC SDU 1-1 (rectangular mark 1120) is "5"; the score associated to the MAC SDU 2-1 (rectangular marker 1130) is "3". Therefore, according to the LCP procedure of the fifth embodiment of the present invention, the scheduled order in which the data to be uploaded in the logical channels C1, C2 and C3 is allocated resources as follows: SDU 1-2→SDU 2-1→SDU 1-1→SDU 1-3→SDU 2-2→SDU 3-1. Then, when there are other redundant wireless resources, the redundant wireless resources will be allocated to the PDU set SDU 1-4 and SDU 2-3. In other words, if the score calculated according to equation (1) is scheduled in a decreasing order, the MAC SDU 1-2 is scheduled to be uploaded to the base station gNB first, and the MAC SDU 2-1 is scheduled to be uploaded to the base station gNB second and then other MAC SDU 1-1, 1-3, 2-2 and 3-1 are scheduled to be uploaded to the base station gNB.

In the other hand, assuming the scale parameter A is 20, and the score associated to the MAC SDU 1-2 (rectangular mark 1110) is "5"; the score associated to MAC SDU 1-1 (rectangular mark 1130) is "1"; the score associated to the MAC SDU 2-1 (rectangular marker 1120) is "3". Therefore, according to the LCP procedure of the fifth embodiment of the present invention, the scheduled order in which the data to be uploaded in the logical channels C1, C2 and C3 is allocated resources as follows: SDU 1-1→SDU 2-1→SDU 1-2→SDU 1-3→SDU 2-2→SDU 3-1. Then, when there are other redundant wireless resources, the redundant wireless resources will be allocated to the PDU set SDU 1-4 and SDU 2-3. In other words, if the score calculated according to equation (1) is scheduled in a decreasing order, the MAC SDU 1-1 is scheduled to be uploaded to the base station gNB first, and the MAC SDU 2-1 is scheduled to be uploaded to the base station gNB second and then other MAC SDU 1-2, 1-3, 2-2 and 3-1 are scheduled to be uploaded to the base station gNB.

In the sixth embodiment of the present invention, uplink grant information includes a reliability index. And, the scheduling and allocating resources for the uplink grant information to the PDU sets is performed on the PDU sets based on reliability indexes of the logical channels for indicating reliabilities among the logical channels. The higher priority, more important, and more urgent data is, the higher for the reliability index for the selected logical channels with the allocated resources are chosen for use is. For instance, there are three logical channels C1-C3 in the embodiment. The traffic source 1 can be mapped to three logical channels C1-C3 with the PDU set delay budget (PSDB) for 10 ms. The reliability index of the logical channels C1 is "1" (meant for low MCS (MCS means a modulation and coding scheme)), the reliability index of the logical channels C2 is "2" (meant for medium MCS), and the reliability index of the logical channels C3 is "3" (meant for high MCS). Thus, the logical channels C1 may be allocated to the higher priority of the PDU sets (e.g., I frame type of the video streaming) for high reliability, the logical channels C2 may be allocated to the medium priority of the PDU sets (e.g., P frame type of the video streaming) for medium reliability, and the logical channels C3 may be allocated to the low priority of the PDU sets (e.g., other frame type of the video streaming) for low reliability.

In the seventh embodiment of the present invention, the uplink grant information includes a PUSCH transmission duration. And, the scheduling and allocating resources for the uplink grant information to the PDU sets is performed on the PDU sets based on a maximum PUSCH duration allowed for transmission of the selected logical channel. The resources of the selected logical channel are allocated in response to remaining PDU set delivery time of each of the PDU sets in the selected logical channel is larger than or equal to the PUSCH transmission duration. In the other hand, in response to the remaining set delivery time of a specific PDU set in the selected logical channel is smaller than a value of the PUSCH transmission duration plus a time offset of a physical layer, discarding the specific PDU set. In the embodiments, the step for scheduling and allocating resources for the uplink grant information to the PDU sets buffered in logical channels based on the at least one parameter of each of the PDU sets comprising: scheduling and allocating resources for the uplink grant information to the PDU sets buffered in a selected logical channel further based on a maximum PUSCH duration allowed for transmission of the selected logical channel, wherein the maximum PUSCH duration allowed for transmission of the selected logical channel is pre-configured by the base station, and the resources of the selected logical channel are allocated in response to the maximum PUSCH duration allowed for transmission of the selected logical channel is larger than or equal to the PUSCH transmission duration associated to the UL grant, wherein remaining delivery time of each of the PDU sets in the selected logical channel is smaller than the maximum PUSCH duration allowed for transmission of the selected logical channel.

In the embodiments of the present invention, the uplink grant information includes a reliability index. The step for scheduling and allocating resources for the uplink grant information to the PDU sets buffered in logical channels based on the at least one parameter of each of the PDU sets comprising: scheduling and allocating resources for the uplink grant information to the PDU sets buffered in a selected logical channel further based on a reliability list of the selected logical channel, wherein the reliability list of the selected logical channel sets the allowed reliability index for transmission and is pre-configured by the base station, and the resources of the selected logical channel are allocated in response to the reliability list configured with the selected logical channel includes the reliability index associated to the UL grant.

In the embodiments of the present invention, the step for scheduling and allocating resources for the uplink grant information to the PDU sets buffered in logical channels based on the at least one parameter of each of the PDU sets further comprising: in response to the remaining delivery time of a specific PDU set in the selected logical channel is smaller than a value of the PUSCH transmission duration plus a time offset of a physical layer, discarding the specific PDU set.

In the embodiments of the present invention, the radio resource control configuration message includes a plurality of logical channels with priority values respectively further comprising: resources are scheduled and allocated for the uplink grant information to the PDU sets buffered in the logical channels further based on the priority values of the plurality of logical channels. In the embodiments of the present invention, the radio resource control configuration message further includes a restriction of each of the logical channels, the restriction indicates which uplink grant information can be used for a selected logical channel, wherein the resources are scheduled and allocated for the uplink grant information to the PDU sets buffered in the logical channels further based on the restriction of each of the logical channels, wherein the restriction is at least one of a reliability list of the selected logical channel and a maximum PUSCH duration allowed for transmission of the selected logical channel.

FIG. 12 is a flow chart illustrating a method of logical channel prioritization according to another embodiment of the present invention. In step S1205 of FIG. 12, the UE obtains a radio resource control (RRC) configuration message from a base station, wherein the radio resource control configuration message includes a plurality of logical channels with priority values respectively and restrictions of the logical channels.

In step S1210, the UE sends a buffer status report (BSR) associated to data to be uploaded to the base station. In step 1220, the UE obtains an uplink grant information according to the BSR from the base station. The data to be uploaded are divided into a plurality of PDU sets, each of the PDU sets has at least one parameter to indicate transmission priorities among the PDU sets respectively.

In step S1230, the MAC layer implementation device of the UE schedules and allocates resources for the uplink grant information to the PDU sets based on the priority values of the logical channels and the restrictions of the logical channels, to make a medium access control (MAC) PDU. In the embodiment, the restrictions of the logical channels include one of reliability indexes of the logical channels; and a remaining delivery time for estimating whether the specific PDU set to be transmitted to the base station in the remaining delivery time. Then, in step S1240 of FIG. 12, the UE uploads the MAC PDU to the base station. The implementation of the embodiment of the present disclosure can refer to the above-mentioned embodiments.

Based on the foregoing, the methods for enhancement of logical channel prioritization (LCP) in the wireless communication and a device thereof in the embodiments of the present invention make the MAC layer implementation device (i.e., MAC layer entity) of the UE are able to distinguish priority values of each PDUs in the data to be uploaded, and the resources for the uplink grant information are scheduled and allocated to these sub-data (i.e., the PDUs) buffered in logical channels for making the MAC PDUs, this MAC PDU is uplink transmitted to the base station. The data with higher priority may be uploaded quickly by the MAC layer implementation device, and the data with lower priority may be uploaded lately or even be discarded, so that the data with higher priority may not lost too much by the MAC layer implementation device of the UE, and the quality of the application corresponding to the data to be uploaded may be maintained easily.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method of logical channel prioritization performed by a user equipment, comprising:

obtaining a radio resource control configuration message from a base station, wherein the radio resource control configuration message includes a plurality of logical channels with priority values respectively;

sending a buffer status report (BSR) associated to data buffered in logical channels to be uploaded to the base station;

obtaining an uplink grant information from the base station;

scheduling and allocating resources for the uplink grant information to data buffered in logical channels to be uploaded based on the priority of logical channels or based on at least one parameter, to make a medium access control (MAC) PDU, wherein the data buffered in logical channels to be uploaded are divided into a plurality of protocol data unit (PDU) sets, the at least one parameter are set in each of the PDU sets or in the logical channels to indicate transmission priorities among the PDU sets respectively; and uploading the MAC PDU to the base station, wherein the at least one parameter set in each of the PDU sets includes a remaining delivery time for estimating whether the specific PDU set to be transmitted to the base station in the remaining delivery time.

2. The method according to claim 1, wherein the at least one parameter set in each of the PDU sets further includes:

a PDU set importance message for indicating the transmission priorities of the specific PDU set among the PDU sets; and a score associated to the PDU set importance message and the remaining delivery time.

3. The method according to claim 2, wherein the at least one parameter is the PDU set importance message for each of the PDU sets, and the step for scheduling and allocating resources for the uplink grant information to the PDU sets buffered in logical channels based on the at least one parameter of each of the PDU sets comprising:

scheduling and allocating resources to the PDU sets buffered in the logical channels in a decreasing priority order, wherein a first PDU set on a selected logical channel is uploaded to the base station for the uplink grant while a value of a first PDU set importance message associated with the first PDU set is smaller than a pre-configured PDU set importance threshold regardless of an allowed amount for the uplink grant on the selected logical channel.

4. The method according to claim 2, wherein the at least one parameter are the PDU set importance message for each of the PDU sets and the remaining delivery time for each of the PDU sets, and the step for scheduling and allocating resources for the uplink grant information to the PDU sets buffered in logical channels based on the at least one parameter of each of the PDU sets comprising:

scheduling and allocating resources to the PDU sets buffered in the logical channels in a decreasing priority order, wherein a second PDU set on a selected logical channel is uploaded to the base station for the uplink grant while a value of a second PDU set importance message associated with the second PDU set is smaller than a pre-configured PDU set importance threshold regardless of an allowed amount for the uplink grant on the selected logical channel, and the scheduling and allocating resources is based on the remaining delivery time of each of the PDU sets in an increasing order on the selected logical channel, wherein a third PDU set is uploaded to the base station quicker than a fourth PDU set while a value of a third remaining delivery time associated with the third PDU set is smaller than a value of a fourth remaining delivery time associated with the fourth PDU set.

5. The method according to claim 2, wherein the at least one parameter is the remaining delivery time for each of the PDU sets, and the step for scheduling and allocating resources for the uplink grant information to the PDU sets buffered in logical channels based on the at least one parameter of each of the PDU sets comprising:

scheduling and allocating resources to the PDU sets buffered in the logical channels based on the remaining delivery time of each of the PDU sets in an increasing order, wherein a fifth PDU set is uploaded to the base station quicker than a sixth PDU set while a value of a fifth remaining delivery time associated with the fifth PDU set is smaller than a value of a sixth remaining delivery time associated with the sixth PDU set, or wherein a seventh PDU set is uploaded to the base station quicker than an eighth PDU set while a value of a seventh remaining delivery time associated with the seventh PDU set is smaller than a pre-configured remaining delivery time threshold and a value of an eighth remaining delivery time associated with the eighth PDU set is larger than the pre-configured remaining delivery time threshold.

6. The method according to claim 2, wherein the at least one parameter are the remaining delivery time for each of the PDU sets and the PDU set importance message for each of the PDU sets, and the step for scheduling and allocating resources for the uplink grant information to the PDU sets buffered in logical channels based on the at least one parameter of each of the PDU sets comprising:

scheduling and allocating resources to the PDU sets buffered in the logical channels based on the remaining delivery time of each of the PDU sets in an increasing order, wherein a ninth PDU set is uploaded to the base station quicker than a tenth PDU set while a value of a ninth remaining delivery time associated with the ninth PDU set is smaller than a value of a tenth remaining delivery time associated with the tenth PDU set, and a value of a ninth PDU set importance message associated with the ninth PDU set is smaller than a pre-configured PDU set importance threshold.

7. The method according to claim 2, wherein the at least one parameter is a score associated to the PDU set importance message and the remaining delivery time for each of the PDU sets, and the step for scheduling and allocating resources for the uplink grant information to the PDU sets buffered in logical channels based on the at least one parameter of each of the PDU sets comprising:

scheduling and allocating resources to the PDU sets buffered in the logical channels based on the score associated to each of the PDU sets in an increasing score order, wherein an eleventh PDU set is uploaded to the base station quicker than a twelfth PDU set while a value of an eleventh score associated with the eleventh PDU set is smaller than a value of a twelfth score associated with the twelfth PDU set.

8. The method according to claim 7, wherein the score of each of the PDU sets is calculated by a product of a percentage of a scale parameter multiplied by a value of the PDU set importance message plus a product of a number multiplied by a value of the remaining delivery time of the PDU set, wherein the number is a value obtained by subtracting the percentage of the scale parameter from 1.

9. The method according to claim 8, wherein the scale parameter is configured by the base station.

10. The method according to claim 1, further comprising:

determining, by the user equipment, whether an application type of the data to be uploaded is an extended reality (XR) application, a video streaming application, a VOIP application or an ultra-reliable and low latency communications (URLLC) application to decide whether to schedule and allocate resources for the uplink grant information to the PDU sets buffered in logical channels based on the at least one parameter of each of the PDU sets.

11. A device of logical channel prioritization, comprising:

a processor, is operable to:

obtaining a radio resource control configuration message from a base station, wherein the radio resource control configuration message includes a plurality of logical channels with priority values respectively;

sending a buffer status report (BSR) associated to data buffered in logical channels to be uploaded to the base station;

obtaining an uplink grant information from the base station;

scheduling and allocating resources for the uplink grant information to data buffered in logical channels to be uploaded based on the priority of logical channels or based on at least one parameter, to make a medium access control (MAC) PDU, wherein the data buffered in logical channels to be uploaded are divided into a plurality of protocol data unit (PDU) sets, the at least one parameter are set in each of the PDU sets or in the logical channels to indicate transmission priorities among the PDU sets respectively; and uploading the MAC PDU to the base station, wherein the at least one parameter set in each of the PDU sets includes a remaining delivery time for estimating whether the specific PDU set to be transmitted to the base station in the remaining delivery time.

12. A method of logical channel prioritization performed by a user equipment, comprising:

obtaining a radio resource control configuration message from a base station, wherein the radio resource control configuration message includes a plurality of logical channels with priority values respectively and restrictions of the logical channels;

sending a buffer status report (BSR) associated to data buffered in logical channels to be uploaded to the base station;

obtaining an uplink grant information from the base station;

scheduling and allocating resources for the uplink grant information to the PDU sets based on the priority of the logical channels and the restrictions of the logical channels, to make a medium access control (MAC) PDU; and uploading the MAC PDU to the base station, wherein the restrictions of the logical channels include a remaining delivery time for estimating whether the specific PDU set to be transmitted to the base station in the remaining delivery time.

13. The method according to claim 12, wherein the restrictions of the logical channels further include:

reliability indexes of the logical channels.

14. The method according to claim 12, wherein the uplink grant information includes a reliability index, and the step for scheduling and allocating resources for the uplink grant information to the PDU sets buffered in logical channels based on the priority of the logical channels and the restrictions of the logical channels comprising:

scheduling and allocating resources for the uplink grant information to the PDU sets buffered in a selected logical channel further based on a reliability list of the selected logical channel, wherein the reliability list of the selected logical channel sets the allowed reliability index for transmission and is pre-configured by the base station, and the resources of the selected logical channel are allocated in response to the reliability list configured with the selected logical channel includes the reliability index associated to the UL grant.

15. The method according to claim 12, wherein the uplink grant information includes a PUSCH transmission duration, and the step for scheduling and allocating resources for the uplink grant information to the PDU sets buffered in logical channels based on the priority of the logical channels and the restrictions of the logical channels comprising:

scheduling and allocating resources for the uplink grant information to the PDU sets buffered in a selected logical channel further based on a maximum PUSCH duration allowed for transmission of the selected logical channel, wherein the maximum PUSCH duration allowed for transmission of the selected logical channel is pre-configured by the base station, and the resources of the selected logical channel are allocated in response to the maximum PUSCH duration allowed for transmission of the selected logical channel is larger than or equal to the PUSCH transmission duration associated to the UL grant, wherein remaining delivery time of each of the PDU sets in the selected logical channel is smaller than the maximum PUSCH duration allowed for transmission of the selected logical channel.

16. The method according to claim 15, the step for scheduling and allocating resources for the uplink grant information to the PDU sets buffered in logical channels based on the priority of the logical channels and the restrictions of the logical channels further comprising:

in response to the remaining delivery time of a specific PDU set in the selected logical channel is smaller than a value of the PUSCH transmission duration plus a time offset of a physical layer, discarding the specific PDU set.

17. The method according to claim 12, wherein the radio resource control configuration message includes a plurality of logical channels with priority values respectively further comprising:

resources are scheduled and allocated for the uplink grant information to the PDU sets buffered in the logical channels further based on the priority values of the plurality of logical channels.

18. The method according to claim 12, wherein the radio resource control configuration message further includes a restriction of each of the logical channels, wherein the restriction indicates which uplink grant information can be used for a selected logical channel, wherein the resources are scheduled and allocated for the uplink grant information to the PDU sets buffered in the logical channels further based on the restriction of each of the logical channels, wherein the restriction is at least one of a reliability list of the selected logical channel and a maximum PUSCH duration allowed for transmission of the selected logical channel.

* * * * *